Figure 1:
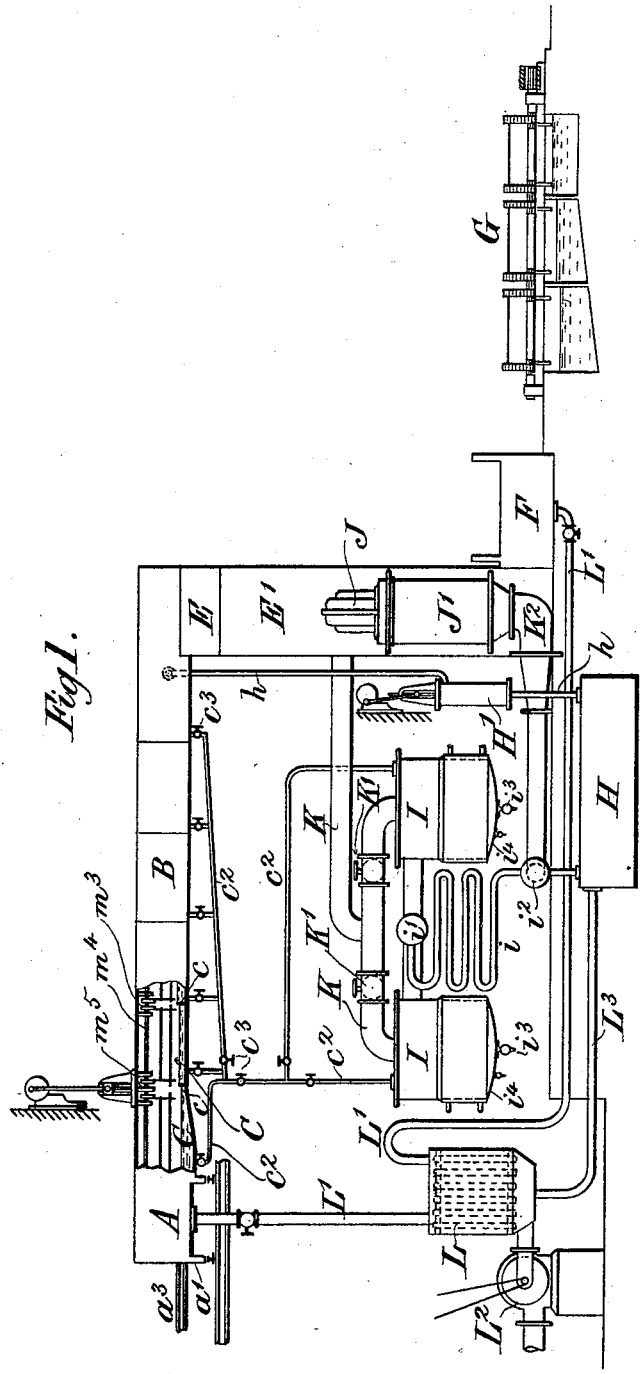

(No Model.) 7 Sheets—Sheet 1.
F. N. TURNEY.
APPARATUS FOR EXTRACTING OIL FROM WOOL.
No. 522,130. Patented June 26, 1894.

Witnesses:
G. W. Rea
Thos. A. Green

Inventor:
Frederick N. Turney,
By James L. Norris.
Atty (No Model.) 7 Sheets—Sheet 2.
F. N. TURNEY.
APPARATUS FOR EXTRACTING OIL FROM WOOL.
No. 522,130. Patented June 26, 1894.

(No Model.) 7 Sheets—Sheet 3.

F. N. TURNEY.
APPARATUS FOR EXTRACTING OIL FROM WOOL.

No. 522,130. Patented June 26, 1894.

Witnesses:
G. W. Rea.
Thos. A. Green

Inventor:
Frederick N. Turney
By James L. Norris.
Atty.

(No Model.)
7 Sheets—Sheet 4.
F. N. TURNEY.
APPARATUS FOR EXTRACTING OIL FROM WOOL.
No. 522,130. Patented June 26, 1894.
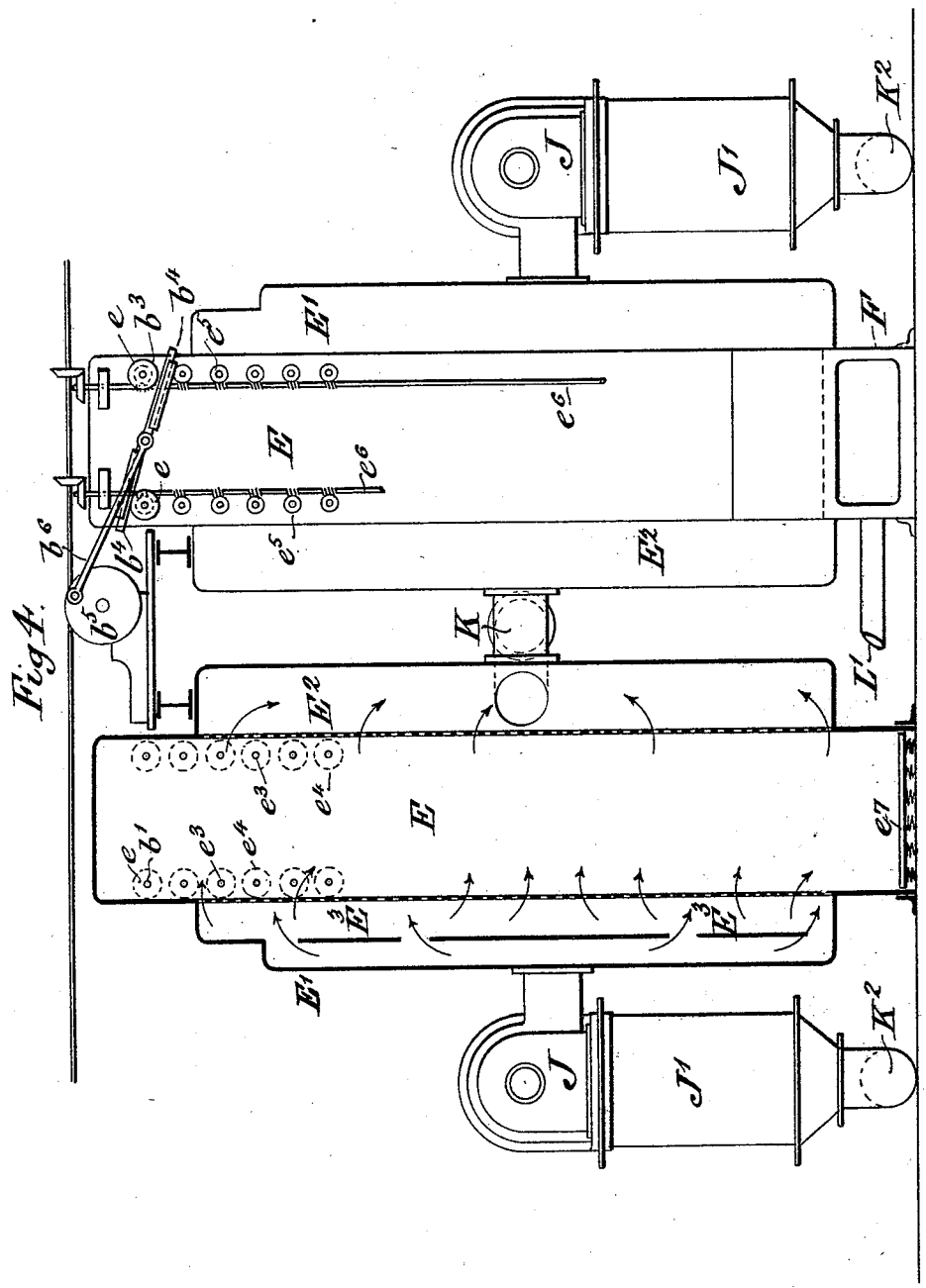
Witnesses:
G. W. Rea.
Thos. A. Green
Inventor;
Frederick N. Turney,
By James L. Norris.
Atty

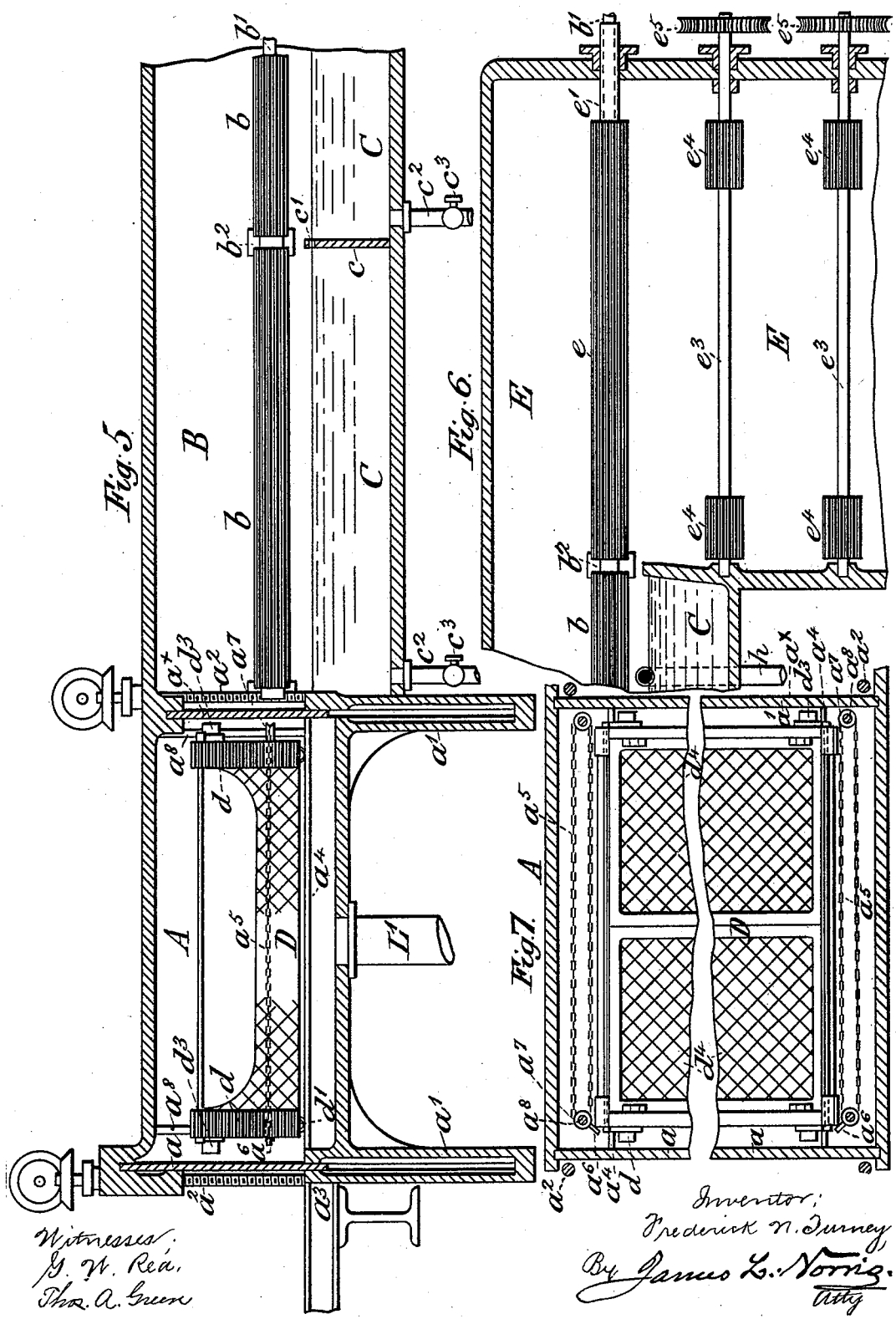

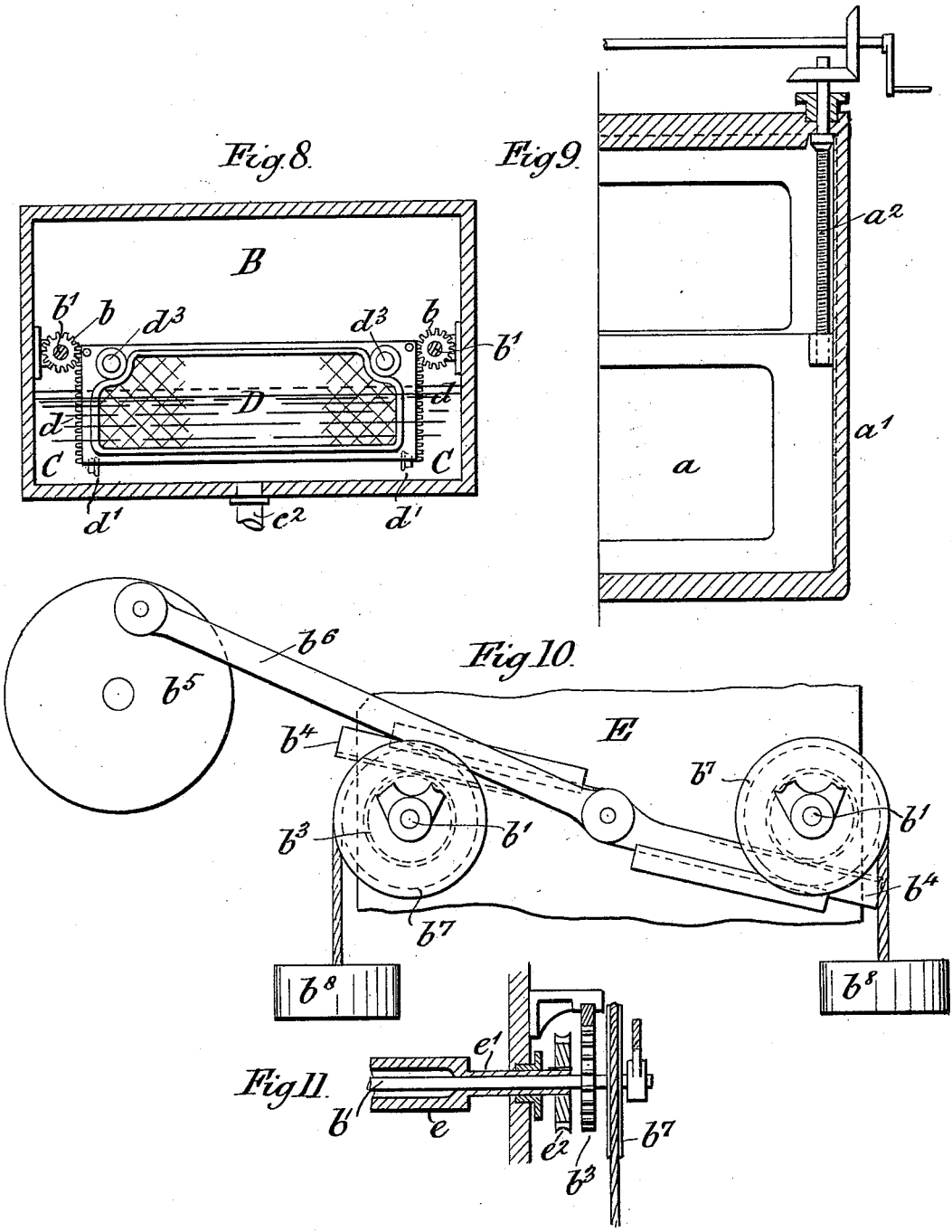

(No Model.) 7 Sheets—Sheet 7.
F. N. TURNEY.
APPARATUS FOR EXTRACTING OIL FROM WOOL.
No. 522,130. Patented June 26, 1894.
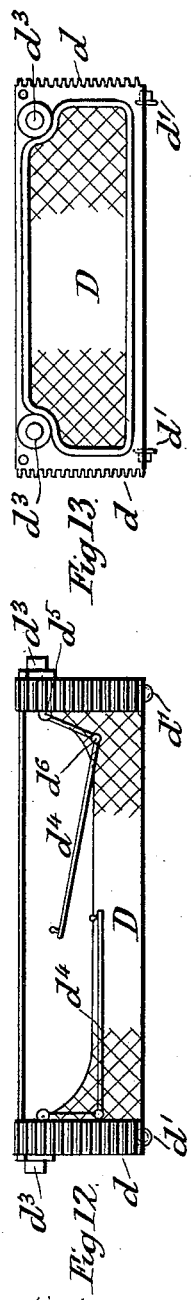
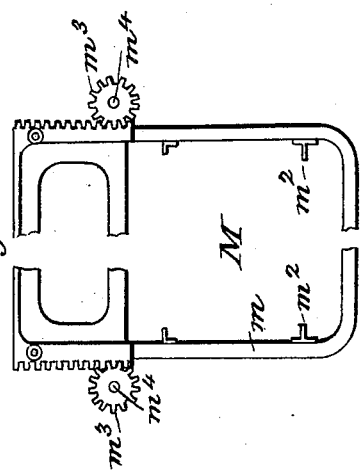
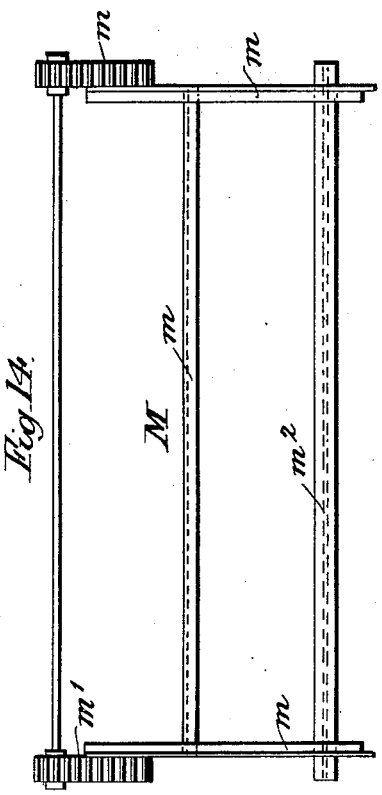
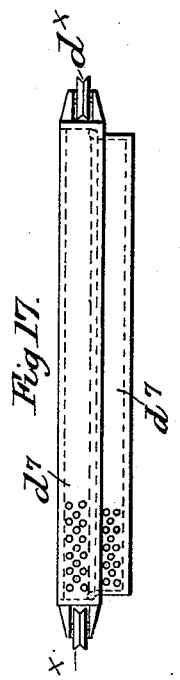
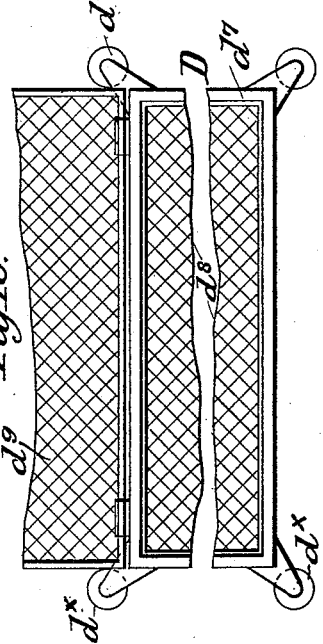

UNITED STATES PATENT OFFICE.

FREDERICK NICHOLSON TURNEY, OF NOTTINGHAM, ENGLAND.

APPARATUS FOR EXTRACTING OIL FROM WOOL.

SPECIFICATION forming part of Letters Patent No. 522,130, dated June 26, 1894.

Application filed March 3, 1894. Serial No. 502,224. (No model.)

*To all whom it may concern:*

Be it known that I, FREDERICK NICHOLSON TURNEY, a subject of the Queen of Great Britain and Ireland, residing at Nottingham, England, have invented certain new and useful Improvements in Scouring, Degreasing, and Cleansing Wool and Apparatus Therefor, of which the following is a specification.

My invention relates to improvements in apparatus for scouring, degreasing, and cleansing wool and woolly fleeces, by means of a volatile solvent, the construction being such that there is practically no loss of the solvent employed for the extraction of the grease and fatty matters, and the wool need not be handled, after it enters the apparatus, until the cleansing is complete, the process of degreasing and scouring being carried on in vapor-tight apparatus and the wool being treated in a form in which it readily parts with dirt and impurities, without being torn or broken by mechanical devices.

In carrying out my invention, the greasy or raw wool is placed in suitably constructed trays or boxes, which are fed, by mechanical means, through a receiving chamber, or entry air-lock, into a degreasing chamber in which is arranged a series of tanks containing a solvent, and into which tanks the said trays or boxes are dipped successively by suitable mechanism. From the degreasing chamber the boxes are conveyed into an evaporating or drying chamber in which the wool is subjected to the action of a current of warm air, whereby it is dried and the remaining solvent evaporated out, the air being led to a condenser for the purpose of recovering the solvent for re-use. The solvent is caused to pass from one tank to another, in the opposite direction to that in which the wool is passing, so that the wool as it becomes cleaner meets fresher solvent in each tank. After flowing through the series of tanks, the solvent is conducted to a distilling apparatus in which it is evaporated and recovered for further use.

The drying chamber is provided with suitable means for enabling the trays, after entering therein, to be lowered and to become piled one above the other. An exit chamber, or air lock, is arranged for permitting the removal of the boxes from the drying chamber without loss of vapor, and this chamber, and also the receiving chamber, are connected with apparatus for recovering any vapor that may pass into them. After leaving the evaporating chamber, the wool is conducted to washing apparatus of ordinary or suitable construction, in which it is washed to improve its color.

In order that my invention may be readily understood, I will describe the same fully with reference to the accompanying drawings, in which—

Figure 2:
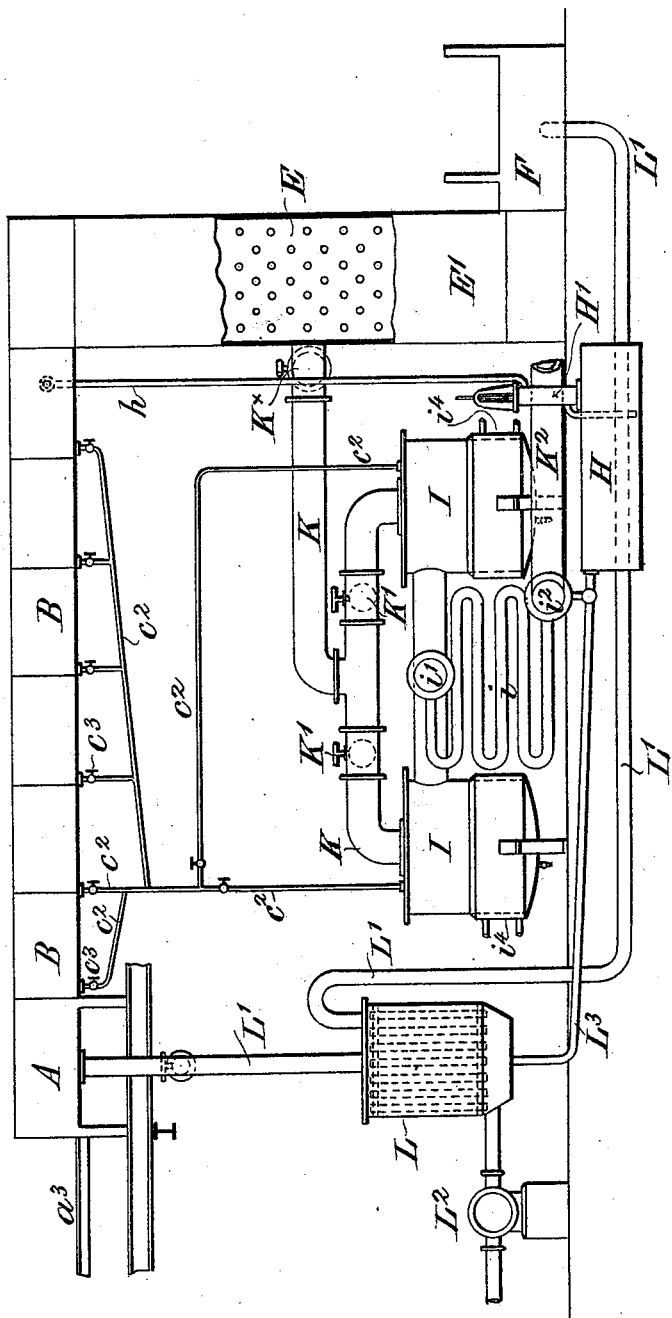

Figure 1 is a general view of one arrangement of apparatus constructed according to my invention. Fig. 2 is a side elevation, Fig. 3 a plan, and Fig. 4 an end elevation, partly in section, of an arrangement forming a battery. Fig. 5 is a longitudinal section, to a larger scale, showing the receiving chamber and a portion of the degreasing chamber, with the solvent tanks for use with this latter arrangement. Fig. 6 is a vertical section, also to a larger scale, showing the upper part of the evaporating or drying chamber. Fig. 7 is a horizontal section of the receiving chamber, or entry air-lock, showing a box or tray in position, and the means for passing the same into the degreasing chamber. Fig. 8 is a transverse section of the degreasing chamber showing one of the boxes or trays in its lowered position therein. Fig. 9 is a half vertical section showing the arrangement of the vapor-tight doors of the receiving chamber or air lock. Fig. 10 is a detail view representing the means for lowering the boxes into, and raising them from, the solvent tanks. Fig. 11 shows, in section, the arrangement for permitting the boxes in the degreasing chamber to be dipped, while those in the evaporating or drying chamber are being lowered down the same. Figs. 12 and 13 represent, in side and end elevations respectively, a construction of box for use where a vertical form of drying chamber is adopted. Fig. 14 is a side elevation and Fig. 15 an end elevation of a frame for dipping the boxes of wool in the solvent, and which may be used when a horizontal form of drying chamber is adopted. Figs. 16 and 17 represent in plan and side elevation respectively, a form of box suitable for use with the aforesaid frames.

Throughout the figures the same letters of reference indicate like parts.

A represents the receiving chamber or entry air-lock; B the degreasing chamber; C the solvent receiving tanks arranged therein; D the boxes or trays for containing the wool; E the evaporating or drying chamber; and F the exit chamber or exit air-lock.

Figure 3:
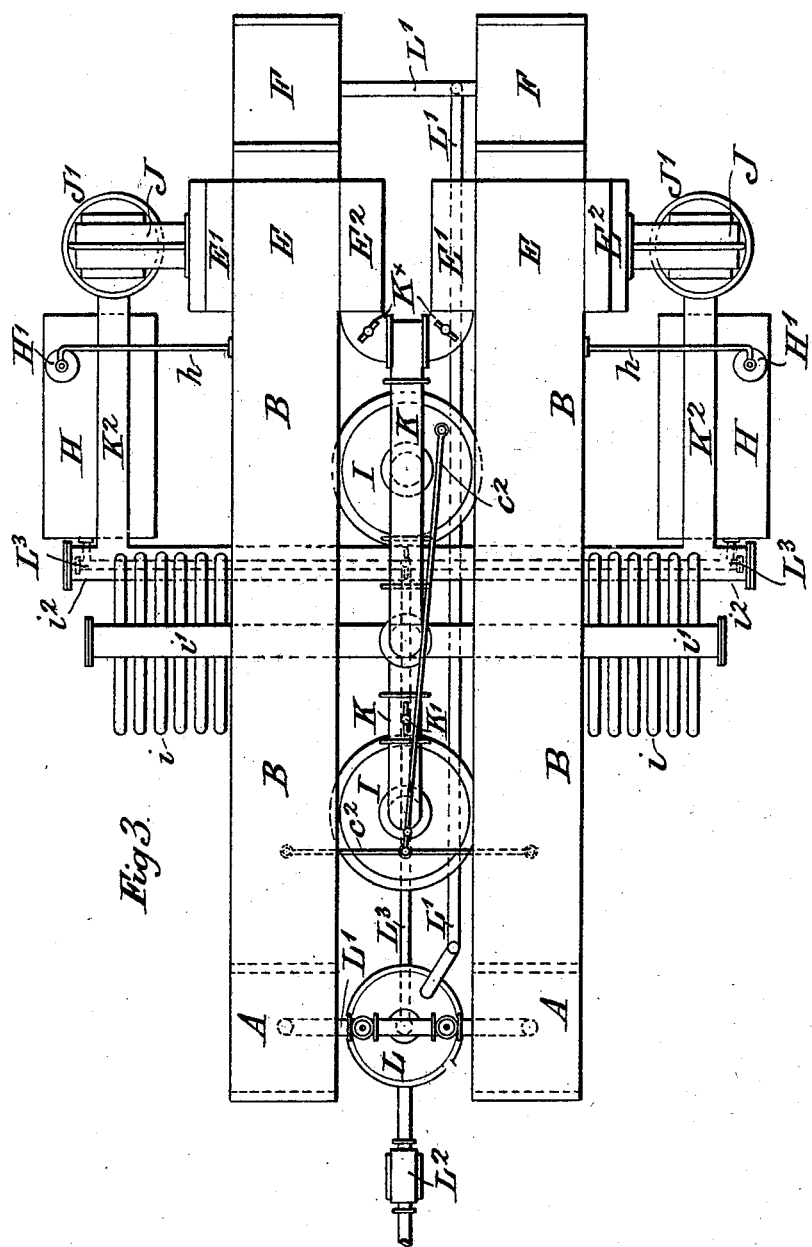

The apparatus may be arranged as shown in Fig. 1, that is to say, with only a single degreasing chamber B and drying chamber E, or a battery of two or more degreasing and drying chambers may be arranged side by side, and worked simultaneously, as shown in Figs. 2, 3 and 4.

The boxes D, containing the wool, are admitted to the receiving chamber A through a vapor-tight sliding door $a$, and pass out of it through a similar sliding door $a^\times$ at its other end, into the degreasing chamber B. These doors are arranged in frames $a'$, and are lowered or opened, and raised or closed, by vertical screw threaded spindles $a^2$, which may be operated, through suitable gearing, by hand, or otherwise. They are rendered vapor tight by having their facings machined, or by the employment of any suitable packing.

In the arrangement shown in Figs. 2 to 6, the boxes are run up to the receiving chamber on rails $a^3$, and the door $a$ being opened, they pass onto rails $a^4$ said boxes being provided with suitable guide rollers $d'$ for the purpose in the said chamber. The door $a$ is then closed, and the door $a^\times$ is opened to allow the boxes to be transferred to the degreasing chamber. This is effected by means of endless chains $a^5$, each having a dog $a^6$ adapted to engage and push forward the box. These chains $a^5$ pass over chain wheels $a^7$ carried by spindles $a^8$, and driven in any convenient manner. When the boxes reach the degreasing chamber B, they engage the fluted roller pinions $b$, which are arranged at each side thereof, and by which the dipping operation is effected, as hereinafter fully described. These fluted roller pinions $b$ are secured upon rock shafts $b'$ which are supported in bearings $b^2$ carried by arms or brackets secured to the sides of the chamber. The shafts $b'$ extend the whole length of the degreasing chamber, and are provided at their outer ends with pinions $b^3$ (see Figs. 4 and 11) engaging racks $b^4$ worked by a crank disk $b^5$ through the medium of a connecting rod $b^6$, by which a reciprocating motion is imparted to the shafts $b'$. To counterbalance the weight of the boxes resting on the rollers, the said shafts $b'$ are provided at their extremities with sheaves $b^7$ from which counter-weights $b^8$ are suspended. The teeth or flutings of all the roller pinions $b$ are arranged in line, so that the boxes can be pushed from one pair of rollers to the next, there being one such pair for each of the tanks C. When a box of wool has been transferred to the rollers, it is dipped as many times as desired in the solvent in the first tank, by rocking—or reciprocating the shafts $b'$. It is then raised out of the solvent and the incoming box pushes it along the rollers until it comes above the next tank, the said incoming box then taking its place over the first tank. Both boxes are then dipped simultaneously, and raised prior to being pushed forward by a fresh box, and so on. After having thus passed through the degreasing chamber B, the boxes are transferred to the evaporating or drying chamber E. In the upper part of this chamber, and on each side thereof, is situated a fluted roller pinion $e$, corresponding in size with the fluted roller pinions $b$, and in line therewith, but mounted, as shown in Fig. 11, by means of a sleeve $e'$ on the shaft $b'$, the said sleeve also carrying a worm wheel $e^2$ by which independent movement can be imparted to the fluted roller pinions $e$.

On each side of the chamber E, at regular intervals below one another, are arranged shafts $e^3$ each carrying a pair of pinions $e^4$ and a worm wheel $e^5$. Outside the chamber, are screw-threaded vertical spindles or worm shafts $e^6$ engaging with the worm wheels $e^2$, $e^5$, and operated by hand, or otherwise, through suitable gear. As the boxes of wool are pushed from the degreasing chamber B, they pass onto the pair of fluted roller pinions $e$, and are lowered gradually down the drying chamber E, to make room for the succeeding boxes, by rotating the fluted roller pinions $e$ and pinions $e^4$. During this time they are subjected to the action of a current of warm air, by which the solvent retained by the wool is evaporated, and on reaching the bottom of said drying chamber, they fall upon a spring platform $e^7$, whence they are transferred to the exit chamber F, by endless chains arranged in like manner to those $a^5$ above described, and which chamber is also of similar construction and arrangement to the chamber A, save that its vapor tight doors are opened by raising, and closed by lowering. They are then removed to a series of washing tanks G (shown in Fig. 1) containing water, or soap and water, or any other suitable washing liquid, in which they are dipped for the purpose of washing the wool, in the same way as they are dipped in the solvent tanks C. The solvent tanks are separated from each other by partitions $c$ and may be arranged either so that the solvent is at the same level in all, as in Fig. 5, or at successively higher levels, as in Fig. 1; and communication may be effected between the tanks, as in Fig. 5, by apertures $c'$ in the partitions $c$, or by allowing the solvent to overflow from one tank to the next, or by other convenient means.

The solvent for each degreasing chamber is stored in a tank H, and is drawn by the pump H' through the pipes $h$ into the tank C, which is farthest from the receiving chamber A, and flows toward the said chamber, from tank to tank, through the whole series, so that the wool traveling in the opposite direction meets cleaner solvent in each tank through which it passes, and is consequently washed or dipped in cleaner solvent as more dirt, grease, and grit are removed from it.

A system of pipes $c^2$, provided with cocks $c^3$, enables the solvent and sediment to be run from the tanks into one or other of the stills I, wherein the solvent is distilled from the impurities it had taken up, and after being condensed in the worms $i$, connected to a pair of vapor drums or mains $i'$, $i^2$, is returned to the tank H. Each of the stills I, has a draw off cock $i^3$ for running off the impurities separated from the solvent and has also a steam jacket $i^4$ provided with steam inlet and exhaust pipes. Two such stills are employed, so that after one of them has been at work some time, it can be shut off for cleaning out, and the other one be brought into use. I prefer to shut off the still to be cleaned out, some time before opening its draw off cock $i^3$, in order to allow any residual spirit to be completely extracted from the grease and impurities.

The arrangement for producing the current of warm air in the drying chamber E, or in each drying chamber, and for recovering the solvent removed in the drying process, is shown in Figs. 1, 2 and 4. The chamber E, or each chamber, is provided with air chests $E'$, $E^2$, arranged one on each side, and the walls of said chamber E are perforated to permit the passage of air through it from the chest $E'$ to the chest $E^2$. A fan or blower J draws warm air from a heater $J'$ and passes it to the air chest $E'$, baffles $E^3$ being arranged in this chest to more effectually distribute the air. The warm air after passing through the chamber E, and acting on the wool, then passes to the other air chest $E^2$, whence it passes through a system of pipes K provided with valves $K'$, and in the case of the battery arrangement (Figs. 2, 3 and 4) with valves $K^\times$ for shutting off one or other of the chambers E. The pipes K conduct the air through the stills I (in which the air promotes the evaporation of the solvent) to the aforesaid condensing worms $i$, where the vapor is condensed. The air is then returned through a pipe $K^2$ to the heater $J'$, and thus circulates continuously through the apparatus.

In order to effect the recovery of any solvent that may escape from each degreasing chamber and drying chamber, into their respective receiving and exit chambers, these latter chambers are connected with a condenser L, by pipes $L'$, the air mixed with the vapor being drawn by an exhauster or a pump $L^2$ from the said chambers to the condenser, wherein the solvent is caused to condense, and from which it is returned to the tank H through the pipe $L^3$.

In the construction of box shown in Figs. 12 and 13, the sides, bottom, and top thereof are formed of wire gauze secured in a suitable framework, and racks $d$ are provided at the ends to engage with the fluted rollers $b$, runners $d'$, being also provided to facilitate the movement of the box. $d^3$ are buffers for lessening shock when the boxes are pushed against each other, and also for insuring proper spacing of these boxes in the degreasing chamber B. In this arrangement the boxes are provided with flap or detachable covers $d^4$ hinged to the ends thereof at $d^5$, and said covers are formed in two parts, jointed at $d^6$ for the purpose of holding down the wool when the boxes are dipped into the solvent. According to another arrangement, the boxes are supported, while in the degreasing chamber, by means of dipping frames M (such as shown in Figs. 14 and 15) consisting of a strong metal structure or framework $m$ provided with racks $m'$, and rails $m^2$. One of these frames is arranged, as shown in Fig. 1, over each of the tanks C, and is supported by pinions $m^3$, on a rocking shaft $m^4$ operated by a rack $m^5$ engaging a toothed wheel thereon, or otherwise. These frames are arranged with their rails $m^2$ in line, so that the boxes can travel from frame to frame. The boxes are passed from the chamber A into the frames by means of endless chains and dogs, as above described, for passing them on to the fluted rollers, although I do not confine myself to the use of these means, in either case, as it is obvious that any other convenient contrivance may be adopted. By rocking the shaft $m^4$, the frames M, with the boxes therein, can be raised and lowered, and the dipping effected as many times as desired, the boxes already in the frames being pushed forward the distance of a tank by each incoming box. With such an arrangement, a horizontal drying chamber may be employed, through which the boxes would be passed on rails disposed in line with the rails $m^2$, and the wool would be dried by warm air in the same manner as that previously described. The boxes used with this arrangement are adapted to run on the rails $m^2$, instead of being supported by the reciprocating fluted rollers. For this purpose they are, as shown in Figs. 16 and 17, provided with horizontal grooved wheels $d^8$, and are formed in two parts $d^7$, the smaller of which fits telescopically inside the other, so as to allow of different quantities of wool being placed therein, and also to allow, if desired, of their being passed through a suitable platen press, or rollers, to squeeze out some of the solvent, prior to their passage through the drying chamber. The sides of these boxes are perforated, and their bottoms $d^8$, and covers $d^9$ are formed of wire gauze. These covers may be hinged, as shown, or they may be loose in order to rest upon and hold down the wool.

Suitable stuffing boxes are provided where necessary, as for instance, at the ends of the screw-threaded spindles $a^2$, and shafts $b'$ and $e^3$, to prevent escape of vapor of solvent from the apparatus. Glazed openings or sight-holes may also be provided where necessary, to permit of inspection of the interior of the apparatus during working.

The operation of my improved apparatus is as follows: The raw or greasy wool is placed in the trays D and the trays run up on the rails $a^3$ to the receiving chamber A, and the door $a$ being opened, one of the trays is passed onto the rails $a^5$ into said chamber. The door $a$ is now closed and the door $a^x$ is opened to allow the tray to be transferred to the degreasing chamber B. This is effected by actuating the chains $a^5$, the dogs $a^6$ engaging the rear ends of the tray and pushing it forward into the chamber B where the grooved racks $d$ on the sides of the tray are engaged by the grooved rollers or pinions $b$, and the door $a^x$ is closed. The pinions $b$ are alternately rotated in opposite directions and raise and lower the trays in and out of the tank C containing the solvent. A second tray is then run into the degreasing chamber in the manner before described, pushing before it the first tray onto the pinions arranged over the second tank, and both trays are dipped into the tanks. As succeeding trays are run into the degreasing chamber they push the preceding trays step by step along the pinions $b$ by which they are successively dipped in the tanks C, and said tanks being supplied with solvent in the manner before described the trays as they advance meet cleaner solvent in each succeeding tank. As each tray reaches the end of the degreasing chamber it is pushed by the succeeding trays onto the pinions $e$ in the drying chamber E by which it is lowered onto the series of pinions $e^4$ and is in turn lowered by the latter onto the spring platform $e^7$ at the bottom of the chamber. The trays in their downward passage through the drying chamber are subjected to a current of heated air forced through said chamber by the fan J, as before described, which volatilizes the solvent and dries the wool. From the bottom of the drying chamber the trays are transferred to the exit chamber F in the same manner as they are transferred from the receiving chamber A, and from said exit chamber they are removed to the series of washing tanks G in which they are dipped into water in the manner before described for the purpose of washing the wool. The solvent for the degreasing chamber is drawn by the pump H' from the tank H and forced up the pipe $h$ into the tank C farthest from the receiving chamber and flows toward said chamber from tank to tank so that the wool meets cleaner solvent in each tank. The solvent passes from the tank C by a system of pipes $c^2$ into one of the stills I, where it is distilled from the impurities it has taken up and after being condensed in the worms $i$ is returned to the tank H. The solvent escaping from the degreasing and drying chambers into the receiving and exit chambers is drawn by the exhauster $L^2$ through the pipes L' into the condenser L, where it is condensed and from which it is returned to the tank H through the pipe $L^3$.

Although my apparatus is specially designed for treating wool, and woolly fleeces, it is obvious that such apparatus may be employed for treating other materials that can be conveniently placed in trays or boxes, such for example as cotton waste, leather scraps, &c.

Having now particularly described and ascertained the nature of my said invention and in what manner the same may be performed, I declare that what I claim is—

1. In apparatus for degreasing and scouring wool, the combination with a degreasing chamber B containing a series of tanks C for containing solvent, of rock-shafts $b'$ arranged longitudinally over each side of the tanks and carrying pinions $b$, a pinion $b^3$ mounted on one end of each of said shafts, a reciprocating rod $b^6$ carrying racks $b^4$ engaging the opposite sides of the pinion $b^3$, means for reciprocating said rod, and a series of trays for carrying the materials to be degreased, provided upon their opposite ends with toothed racks adapted to engage said pinions $b$, substantially as described.

2. In apparatus for degreasing and scouring wool, the combination with a degreasing chamber B containing a series of tanks C, of rock-shafts $b'$ arranged longitudinally over each side of the tanks and carrying pinions $b$ the teeth of which are in alignment with each other, a pinion $b^3$ mounted on one end of each of said shafts, a reciprocating rod $b^6$ carrying racks $b^4$ engaging the opposite sides of the pinions $b^3$, a crank $b^5$ for reciprocating said rod, a series of trays for carrying the materials to be degreased provided upon their opposite ends with toothed racks adapted to engage said pinions $b$, and means for moving said trays longitudinally upon the pinions $b$ for successively bringing them over the tanks, substantially as described.

3. In apparatus for degreasing and scouring wool, the combination with the degreasing chamber B, of a receiving chamber A provided with a sliding air-tight door $a^x$ arranged between the degreasing and receiving chambers, an air-tight door $a$ for closing the entrance to the receiving chamber, mechanism for independently operating said doors, means for transferring the material to be degreased from the receiving chamber to the degreasing chamber, and a condenser communicating with the receiving chamber for recovering the solvent escaping from the degreasing into the receiving chamber, substantially as described.

4. In apparatus for degreasing and scouring wool, the combination with the degreasing chamber B, of a receiving chamber A provided with a sliding air-tight door $a^x$ arranged between the degreasing and receiving chambers, an air-tight door $a$ for closing the entrance to the receiving chamber, mechanism for independently operating said doors, trays D for carrying the materials to be degreased, and endless chains $a^5$ carried by spindles $a^8$ and provided with dogs $a^6$ for engaging said trays to transfer the same from the receiving chamber to the degreasing chamber, substantially as described.

5. In apparatus for degreasing and scouring wool, the combination with a degreasing chamber and a drying chamber, of air-tight receiving and discharging chambers communicating respectively with said degreasing and drying chambers, air-tight doors for controlling the communication between said chambers, doors for closing the entrance and discharge openings of said receiving and discharge chambers, mechanism for independently operating said doors, and a condensing apparatus for recovering the solvent from the vapor contained in said chambers, substantially as described.

6. In apparatus for degreasing and scouring wool, a drying chamber comprising a chamber E having foraminous side walls, chests $E'$ and $E^2$ inclosing said side walls, an air inlet communicating with the chest $E'$, an air outlet communicating with the chest $E^2$, and baffle plates $E^3$ arranged at intervals in the chest $E'$ between the air inlet and the chamber E, substantially as described.

7. In apparatus for degreasing and scouring wool, the combination with the drying chamber comprising the chamber having foraminous side walls and chests $E'$, $E^2$ inclosing said walls and provided with an air inlet and outlet, said outlet communicating with a condenser, of shafts $e^3$ journaled in the opposite sides of the chamber E and carrying pinions $e^4$, means for simultaneously rotating said shafts, a spring platform $e^7$ arranged in the bottom of the drying chamber, a discharge chamber communicating with the discharge end of the drying chamber, and air-tight doors controlling the communication between said chambers and the outlet of the discharge chamber, substantially as described.

8. The herein described tray for holding the materials to be degreased and scoured, comprising a box having reticulated side, top, and bottom walls and provided at opposite ends with toothed racks, the tops each consisting of two jointed sections hinged to the side walls of the box, said box being provided with buffers and guide rollers, substantially as described and for the purpose specified.

9. In apparatus for degreasing and scouring wool, the combination of a degreasing chamber, a drying chamber communicating therewith, air-tight receiving and discharge chambers communicating respectively with the degreasing and drying chambers, trays for holding the materials to be degreased, mechanism for transferring said trays from one chamber to the other, a condenser communicating with the receiving and discharge chambers and with a solvent reservoir, a pipe and pump for conveying the solvent from said reservoir to the degreasing chamber, a still communicating with the degreasing chamber for vaporizing the spent solvent, a condenser communicating with said still for condensing the vapor and communicating with the solvent reservoir, a heater for supplying heated air to the drying chamber, and a pipe for conveying the air from the drying chamber to the still, substantially as described.

In witness whereof I have hereunto signed my name in the presence of two subscribing witnesses.

FREDERICK NICHOLSON TURNEY.

Witnesses:
 F. ASHBY NORRIS,
78 *Fleet Street, London.*
 GEO. J. B. FRANKLIN,
17 *Gracechurch Street, London, E. C.*